United States Patent [19]

Drake et al.

[11] Patent Number: 4,678,529

[45] Date of Patent: Jul. 7, 1987

[54] SELECTIVE APPLICATION OF ADHESIVE AND BONDING PROCESS FOR INK JET PRINTHEADS

[75] Inventors: Donald J. Drake, Rochester; Michael R. Campanelli; Dale R. Ims, both of Webster, all of N.Y.

[73] Assignee: Xerox Corporation, Stamford, Conn.

[21] Appl. No.: 881,414

[22] Filed: Jul. 2, 1986

[51] Int. Cl.[4] .......... B32B 31/00

[52] U.S. Cl. .......... 156/234; 156/235; 156/254; 346/1.1

[58] Field of Search .......... 156/234, 235, 241, 254, 156/292, 626; 346/1.1, 75, 140 R

[56] References Cited

U.S. PATENT DOCUMENTS

| | | | |
|---|---|---|---|
| 3,089,800 | 5/1963 | Colfer et al. | 154/46.8 |
| 4,017,581 | 4/1977 | Amidon | 156/254 X |
| 4,027,345 | 6/1977 | Fujisawa et al. | 156/234 X |
| 4,147,579 | 4/1979 | Schade | 156/252 |
| 4,284,457 | 8/1981 | Stonier | 156/237 |
| 4,465,538 | 8/1984 | Schmoock | 156/233 |
| 4,601,777 | 7/1986 | Hawkins et al. | 156/626 |

*Primary Examiner*—David Simmons

*Attorney, Agent, or Firm*—Robert A. Chittum

[57] ABSTRACT

A method of bonding ink jet printhead components together by coating a flexible substrate with a relatively thin, uniform layer of an adhesive having an intermediate non-tacky curing stage with a shelf life with around one month for ease of alignment of the parts and ease of storage of the components having the adhesive thereon. Transferring about half of the adhesive layer on the flexible substrate to the high points or lands of one of the printhead components within a predetermined time of the coating of the flexible substrate by placing it in contact therewith and applying a predetermined temperature and pressure to the flexible substrate prior to peeling it from the printhead component. This causes the adhesive to fail cohesively in the liquid state, assuring that about half of the thickness of the adhesive layer stays with the flexible substrate and is discarded therewith, leaving a very thin uniform layer of adhesive on the printhead component lands. The transferred adhesive layer remaining on the printhead component enters an intermediate non-tacky curing stage to assist in subsequent alignment of the printhead components. The printhead components are aligned and the adhesive layer cured to complete fabrication of the printhead.

10 Claims, 7 Drawing Figures

SELECTIVE APPLICATION OF ADHESIVE AND BONDING PROCESS FOR INK JET PRINTHEADS

BACKGROUND OF THE INVENTION

1. Field of the Invention

This invention relates to the fabrication of ink jet printheads and more particularly to the method of bonding multiple part printheads together without the adhesive obstructing the flow of ink.

2. Description of the Prior Art

Drop-on-demand ink jet printing systems can be divided into two basic types. One type uses a a piezoelectric transducer to produce a pressure pulse that expels a droplet from a nozzle, and the other type uses thermal energy to produce a vapor bubble in an ink-filled channel that expels a droplet. This latter type is referred to as thermal ink jet printing or bubble ink jet printing. Generally, thermal ink jet printing systems have a printhead comprising one or more ink filled channels that communicate with a relatively small ink supply chamber at one end and have an opening at the opposite end, referred to as a nozzle. A thermal energy generator, usually a resistor, is located in the channels near the nozzle a predetermined distance upstream therefrom. The resistors are individually addressed with a current pulse representative of data signals, to momentarily vaporize the ink and form a bubble which expels an ink droplet. The ink droplets expelled from each nozzle by the growth of the bubbles which cause a quantity of ink to bulge from the nozzle and break off into a droplet at the beginning of the bubble collapse. The acceleration of the ink out of the nozzle while the bubble is growing provides the momentum and the velocity of the droplet which, after separation from the nozzle, travels in a substantially straight line towards a recording medium, such as paper.

One preferred method of fabricating thermal ink jet printheads is to form the heating elements on the surfaces of one silicon wafer and the channels and small ink supply chamber or reservoir in the surface of another silicon wafer. The two wafers are precisely aligned to insure that the heating elements are aligned to their corresponding channels and then the two wafers are bonded together. The individual printheads are obtained by dicing the two bonded wafers. This general process has been described in U.S. patent application Ser. No. 719,410 to Hawkins et al, filed Apr. 3, 1985, now U.S. Pat. No. 4,601,777. A critical part of this assembly process is the bonding adhesive and its application. Since two silicon wafers are mated that are extremely flat, a thin adhesive coat is sufficient to bond the two together and a much thicker coat will clog the channels. In earlier printhead fabrication processes, adhesive was spray coated on the entire surface of the wafer containing the ink reservoirs and then the channels were later diced into the wafer with a precise dicing saw. In this manner, the ink channels were clear of adhesive although an adhesive film was left inside each of the reservoirs. This was less than optimal because adhesive coating in the reservoir could break loose and clog channels. Nevertheless, this system of applying adhesive worked whenever the channels were diced after the adhesive was applied.

In the fabricating process disclosed in the above-mentioned patent application to Hawkins et al, the ink channels are fabricated by anisotropic etching of the silicon and are created simultaneously with the reservoir. This method offered a number of significant advantages, but one problem encountered was that the fluid structures (namely, reservoir, fill hole, and channels) are simultaneously created before the adhesive application step. This meant that the former method of applying adhesive over the entire wafer is no longer practical since the adhesive coats the inside of the channels as well. In fact, adhesive tends to flow to the apex of each channel. The result was that ink channels that have an adhesive coat not only presented a potential that the adhesive would break off and clog the channel during operation, but the adhesive changes the effective dimension or cross-sectional area of the channel and therefore the nozzle, so that the tight dimensional control afforded by the anisotropic etching of the channels is lost.

The critical problem then was how to adhesively bond the surface of the silicon wafer containing the sets of heating elements to the surface of the other silicon wafer containing the plurality of small ink reservoirs and associated sets of ink channels with the adhesive being applied to only the mating interfaces between the two wafers. Such a bonding process would mean that all of the fluid structures, that is, the fill hole, ink reservoir, and channels, would be clear of adhesive. A review of the prior art discussed below offered no help.

U.S. Pat. No. 4,284,457 to Stonier et al discloses use of a fabric coated on one side with an adhesive which in turn is covered by a release layer. This sheet of adhesive coated fabric is laid on the edge of a honeycomb and partially cured by heat and pressure. The release sheet prevents the adhesive from contacting the plates through which the pressure is applied. The adhesive is allowed to harden and become brittle so that it is frangible. The fabric is then removed, taking with it most of the adhesive. The adhesive left is that portion adhering to the honeycomb edges that is broken free from the other part of the hardened adhesive layer in the fabric.

U.S. Pat. No. 4,147,579 to Schade discloses a layer of adhesive placed on a conductive substrate. The layer of adhesive must be electrically insulative and permit shapes or parts to be stamped therefrom without separating the special insulating adhesive from the substrate. Electrical components are subsequently adhered to the insulative adhesive which does not flow or run under heat or pressure.

U.S. Pat. No. 4,465,538 to Schmoock discloses placing adhesive on a substrate in a circuit-like pattern and moving a foil layer on a carrier web into contact with the substrate surface having the adhesive patterned thereon. Adhesive is cured and the foil stripped away. The adhesive keeps that portion of the foil contacting it and allows the remainder of the foil to stay with the carrier web. Thus, the foil in the adhesive pattern remains on the substrate for electroplating of the foil to the proper thickness. This technique is used to economically produce circuit boards.

U.S. Pat. No. 3,089,800 to Colfer et al discloses an applique that comprises a metal foil having a predetermined configuration, a release sheet, and adhesive coating therebetween, the adhesive coating being less tenacious to the release sheet than to the foil whereby substantially all of the adhesive remains on the foil when the release sheet is removed. Therefore, this patent is concerned with an adhesive which facilitates total release from the release sheet, a feature unacceptable for the present invention. This is because the surface energy of a low viscosity adhesive would be such that, in a thickness range of a few microns or less, the adhesive would tend to bead up on a release sheet, such as Teflon ®, thus degrading adhesive uniformity.

SUMMARY OF THE INVENTION

It is an object of the present invention to provide a printhead composed of at least two parts which may be accurately aligned with each other and bonded together by an adhesive applied only to the higher surfaces of the substrate containing the ink bearing structures, while all of the surfaces of the ink bearing structures are free of adhesive.

It is another object of this invention to enable the application of an adhesive in a manner wherein its average thickness can be controlled within a few tenths of a micron.

In the present invention, a relatively thin coat of adhesive is placed on a flexible substrate by spray or spin coating techniques. A flexible substrate with the adhesive layer is placed on the printhead part containing the ink structures so that only the high points or lands are in contact with the adhesive layer. A predetermined uniform pressure and temperature is applied to the adhesive layer and then the flexible substrate is peeled therefrom. Since the molecule-to-molecule forces in a liquid are weak compared to the molecule to interface bond with the surface of the printhead part and the release sheet, separation always occurs in the liquid, meaning that the surfaces of the channel plate always retain some of the adhesive but not all. About half of the thickness of the adhesive layer remains with the removed flexible substrate.

A more complete understanding of the present invention can be obtained by considering the following detailed description in conjunction with the accompanying drawings, wherein like parts have the same index numerals.

While the present invention will be described hereinafter in connection with preferred embodiments thereof, it will be understood that it is not intended to limit the invention to those embodiments. On the contrary, it is intended to cover all alternatives, modifications and equivalents as may be included within the spirit and scope of invention as defined by the appended claims.

DESCRIPTION OF THE PREFERRED EMBODIMENT

Figure 1:
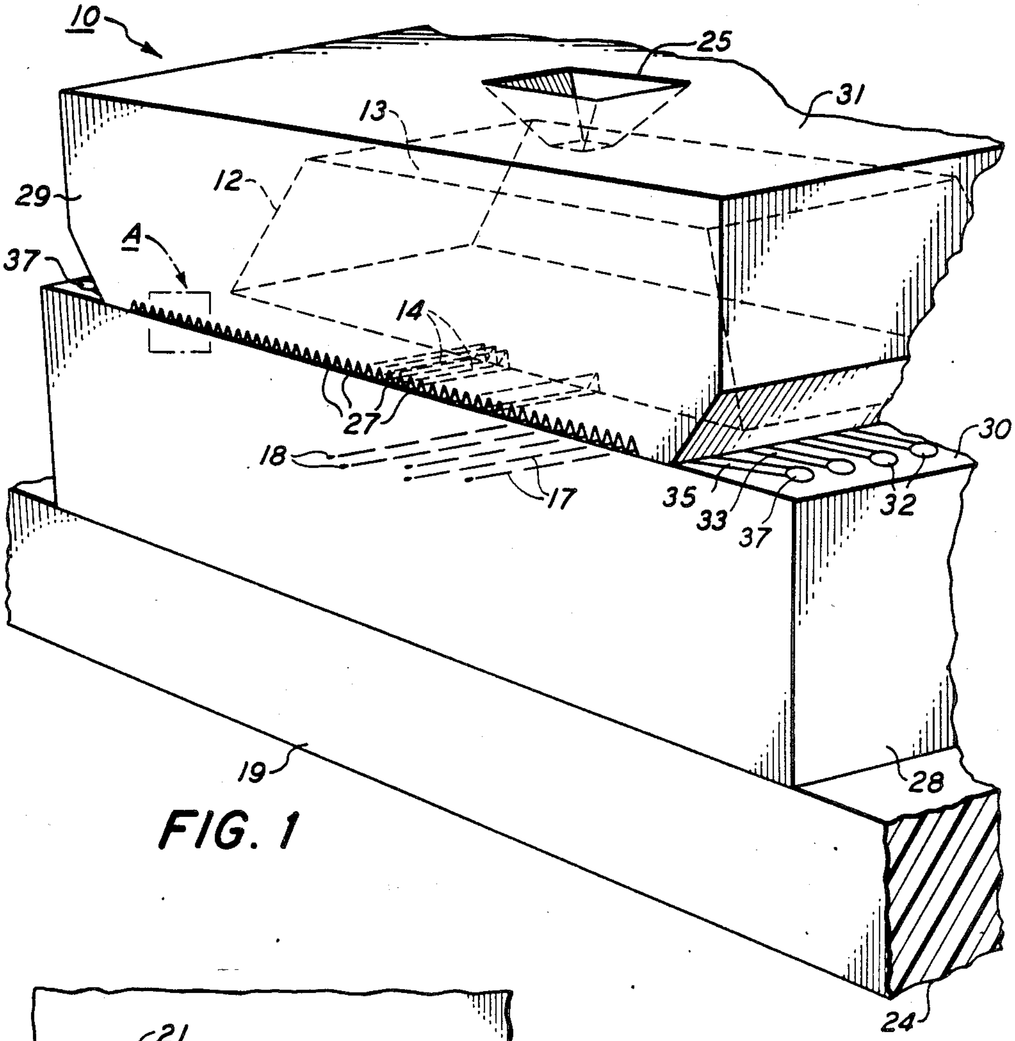
FIG. 1 is an enlarged, partially shown perspective view of the two-part printhead bonded together in accordance with the process of the present invention.

In FIG. 1, an enlarged schematic perspective view of the front face of the printhead 10 is depicted showing the array of droplet emitting nozzles 27. Dashed lines 17 represent the trajectories of droplets 18. The lower electrically insulated substrate 28 has the heating elements (not shown) and addressing electrodes 33 patterned on the surface 30 thereof, while the upper substrate 31 has parallel triangular cross-sectional grooves 14 which extend in one direction and penetrate through the upper substrate front edge 29. The other end of the grooves communicate with a common internal recess 12. The internal recess and the triangular cross-sectional grooves are shown in dashed lines. The floor 13 of the internal recess 12 has an opening 25 therethrough for use as an ink fill hole. The surface of the upper substrate with the grooves are aligned and bonded to the lower substrate 28 as described more fully later, so that a respective one of the plurality of heating elements is positioned in each channel, formed by the grooves and the lower substrate. Ink enters the manifold formed by the recess and the lower substrate through the fill hole and, by capillary action, fills the channels. The ink at each nozzle forms a meniscus, the surface tension of which prevents the ink from weeping therefrom. The addressing electrodes 33 on the lower substrate 28 terminate at terminals 32. The upper substrate or channel plate 31 is smaller than that of the lower substrate or heating element plate 28 in order that the electrode terminals 32 are exposed and available for wire bonding to the electrodes on the daughter board 19 on which the printhead is permanently bonded. For a more detailed description of the manufacturing process for the channel plate and the heating element plate as well as a description of the assembly of the two parts on the daughter board, please refer to U.S. patent application Ser. No. 719,410, filed Apr. 3, 1985, now U.S. Pat. No. 4,601,777 entitled "Thermal Ink Jet Printhead and Process Therefor", by William Hawkins et al, and assigned to the same assignee as the present invention. Since this invention relates to an improved bonding process for the printhead in the Hawkins et al patent application, the subject matter of that application is hereby incorporated by reference.

Figure 2:
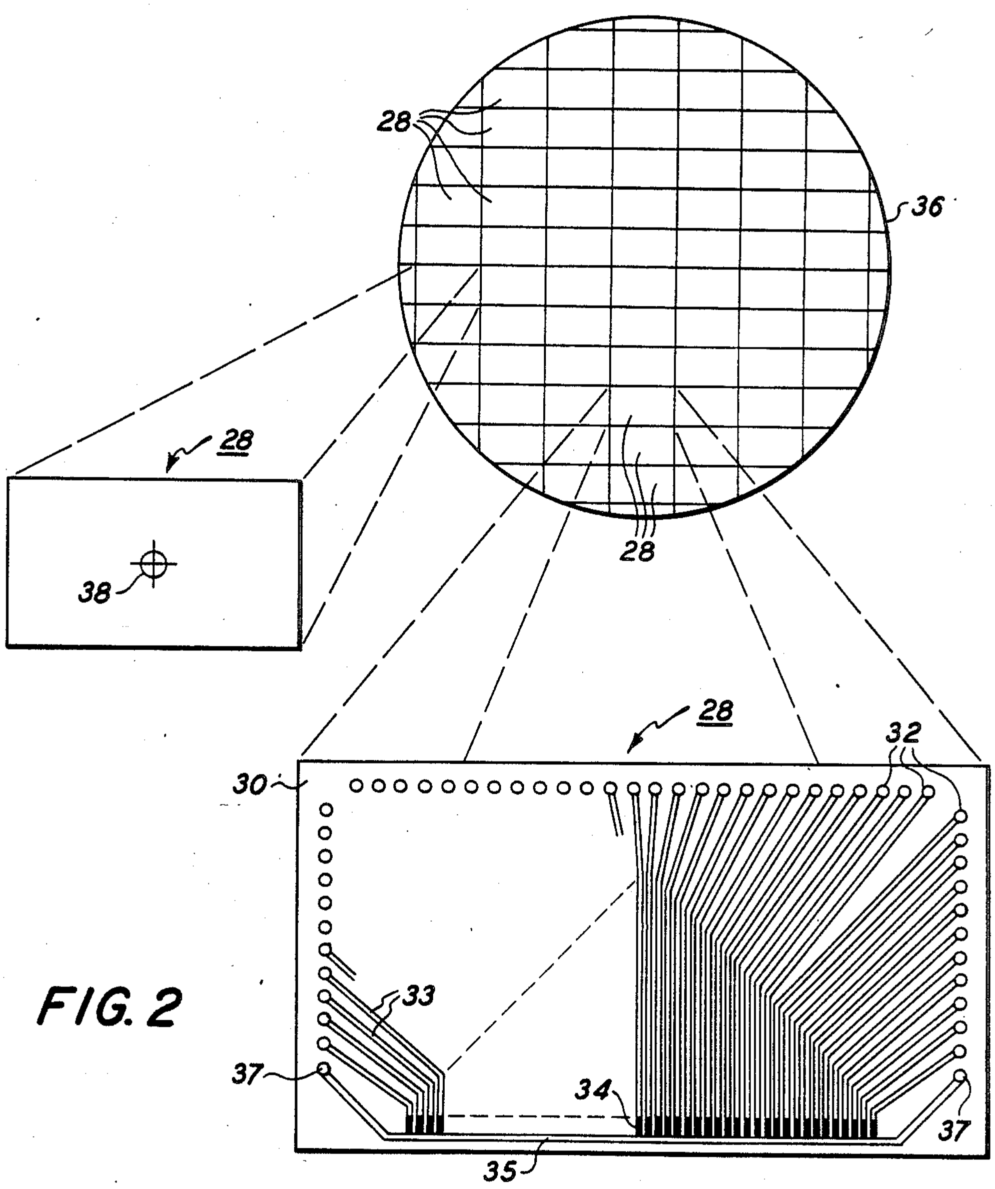
FIG. 2 is a schematic plan view of the wafer having a plurality of heating element arrays and addressing electrodes with one heating element array and one alignment mark being shown enlarged.

In FIG. 2, a plurality of sets of bubble-generating, heating elements 34 and their addressing electrodes 33 are patterned on the polished surface of a single-side-polished, (100) silicon wafer 36. One set of heating elements 34 and addressing electrodes 33 suitable for one ink jet printhead is enlarged. Prior to patterning the multiple sets of printhead electrodes 33, the resistive material that serves as the heating elements, and the common return 35, the polished surface to receive the heating elements and addressing electrodes is coated with an underglaze, such as $SiO_2$, having a thickness of between 500Å and one micron. The resistive material may be a doped polycrystalline silicon which may be deposited by chemical vapor deposition (CVD) or any other well known resistive material such as $ZrB_2$. The common return and the addressing electrodes are aluminum leads deposited on the underglaze layer and over the edges of the heating elements. The common return ends 37 and addressing electrodes terminals 32 are deposited at predetermined locations to allow clearance for wire-bonding to the daughter board electrodes after the channel plate is attached to make the printhead. The common return 35 and addressing electrodes 33 are deposited to a thickness of 0.5 to 3.0 microns, with the preferred thickness being 1.5 microns. For electrode passivation, a 2 micron thick phosphorus doped CVD $SiO_2$ film (not shown) is deposited over the entire plurality of sets of heating elements and addressing electrodes and subsequently etched off of the terminal ends of the common return and addressing electrodes for subsequent connection with the daughter board electrodes by wire bonding. This etching may be by either the wet or dry etching method. Alternatively, the electrode passivation may be accomplished by plasma deposited $Si_3N_4$.

At a convenient point after the underglaze is deposited, at least, two alignment markings 38 are photolithographically produced at predetermined locations on separate lower substrates 28 which substrates make up wafer 36. These alignment markings are used for alignment of the plurality of upper substrates 31 having the channels that make up wafer 39. The surface of the single-sided wafer 36 containing the plurality of sets of the heating elements and addressing electrodes are bonded to the wafer after alignment between the wafers, as explained later.

Figure 3:
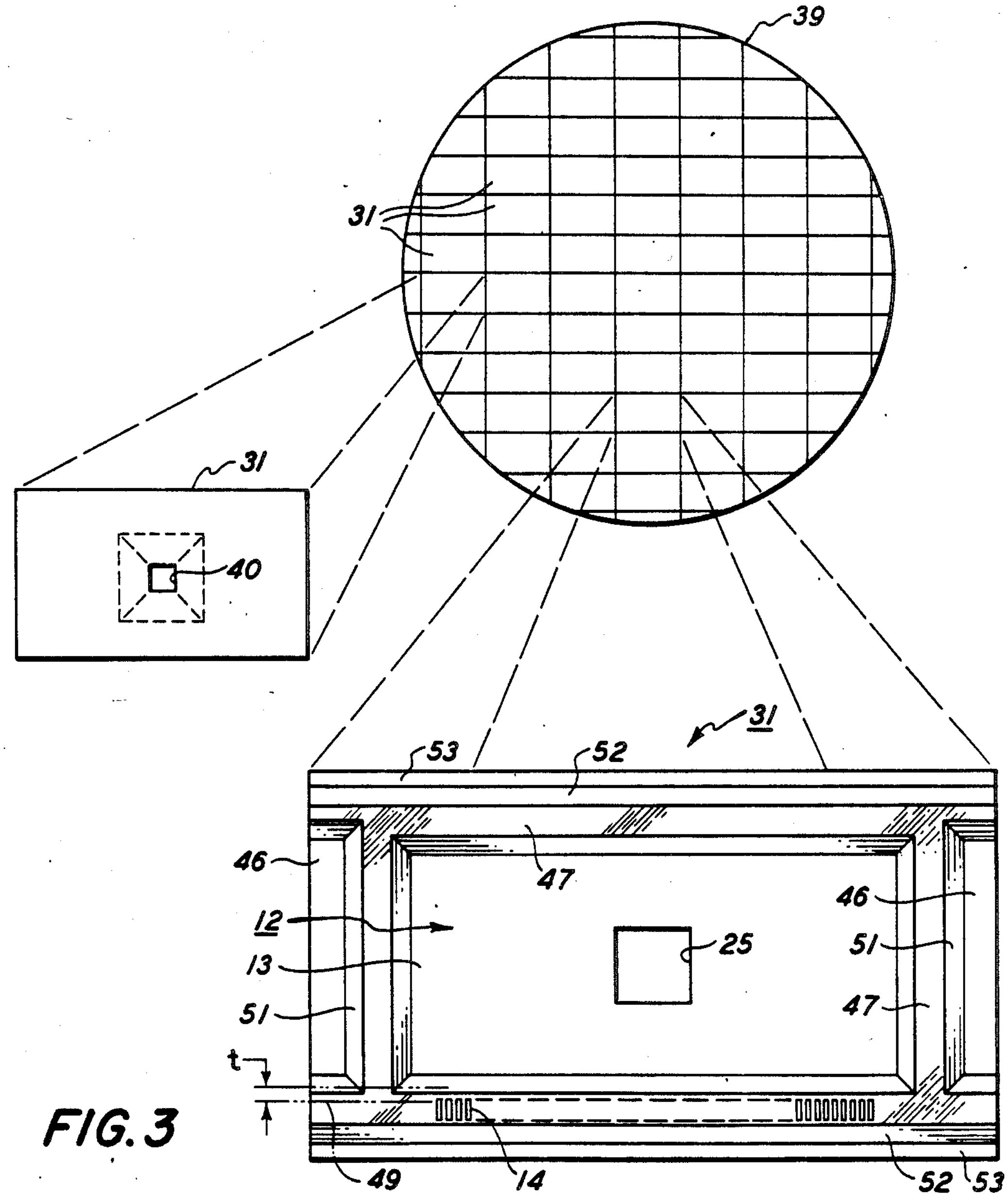
FIG. 3 is a schematic plan view of a wafer having a plurality of ink manifold recesses with the channels concurrently etched therein; this fabrication process also shows one enlarged manifold recess and associated channels as well as one enlarged alignment opening.

Referring to FIG. 3, a two-side-polished, (100) silicon wafer 39 is used to produce the plurality of upper substrates 31 for the printhead. After the wafer is chemically cleaned, a pyrolytic CVD silicon nitrite layer (not shown) is deposited on both sides. Using conventional photolithography, a via for fill hole 25 for each of the plurality of upper substrates 31 and, at least two vias for alignment openings 40 at predetermined locations are printed on one wafer side opposite the side shown in FIG. 3. The silicon nitride is plasma etched off of the patterned vias representing the fill holes and alignment openings. As disclosed in the above-mentioned patent application to Hawkins et al, a potassium hydroxide (KOH) anisotropic etch is used to etch the fill holes and alignment openings. In this case, the {111} planes of the (100) wafer make an angle of 54.7 degrees with the surface of the wafer. The fill holes are small square surface patterns of about 20 mils or 0.5 mm per side, and the alignment openings are about 60 to 80 mils or 1.5 to 2 mm square. Thus, the alignment openings are etched entirely through the 20 mil or 0.5 mm thick wafer, while the fill holes are etched to a terminating apex at about half way to three quarters through the wafer. The relatively small square fill hole is invariant to further size increase with continued etching, so that the etching of the alignment openings and the fill holes are not significantly time constrained. This etching takes about two hours and many wafers can be simultaneously processed.

Next, the opposite side of wafer 39, as shown in FIG. 3, is photolithographically patterned, using the previously etched alignment holes as a reference, to form the relatively large rectangular recesses 12 and associated plurality triangular channel grooves 14 which will eventually become the ink manifolds and ink channels of the printheads, respectively. Also patterned are the two recesses 46 between the manifolds in each substrate 31 and adjacent each of the shorter walls 51 of the manifold recesses. Parallel elongated grooves 53 which are parallel and adjacent each longer manifold recess wall 52 extend entirely across the wafer surface and between the manifold recesses of adjacent substrates 31. The elongated grooves do not extend to the edge of the wafer for reasons explained later. The tops 47 of the walls 51, 52 delineating the manifold recesses are portions of the original wafer surface that still contain the silicon nitrite layer and forms the streets 47 on which the adhesive will be applied later for bonding the two wafers 36, 39 together. Optionally, the silicon nitrite layer may be removed from the lands 47. The elongated grooves 53 and recesses 46 provide clearance for the printhead electrode terminals during the bonding process discussed later. A KOH solution anisotropic etch is used to produce the recess and channel grooves but, because of the size of the surface pattern of the manifold recess, the etching process must be timed to stop the depth of the manifold recess. Otherwise, the pattern size is so large that the etchant would etch entirely through the wafer. The floor 13 of the manifold recess 12 is determined at a depth where the etching process is stopped. This floor 13 is low enough to meet or slightly surpass the depth of the fill hole apex, so that an opening is produced that is suitable for use as the ink fill hole 25.

In one embodiment, the fabricating process requires that parallel milling cuts be made at the end of the channel grooves which are adjacent the manifold recess 12. The milling or dicing cuts are perpendicular to the channel grooves. Of necessity, the cut on the interior side of the manifold recess also cuts a gap 49 in the walls of the manifold recess. These narrow cuts having thicknesses "t" are filled later during the application of a passivation layer which is accomplished after the printhead is mounted and wire bonded to the daughter board 19. The cut on the exterior side of the channels is preferably accomplished after the wafers are bonded together in the step of dicing out individual printheads. Thus, the channels are opened and the nozzles are formed in the perpendicular upper substrate face 29.

As disclosed in the Hawkins et al patent application mentioned above, anisotropic etching of (100) silicon wafers must always be conducted through square or rectangular vias in a protective layer, so that the etching is along the {111} planes. Thus, each recess or opening has walls at 54.7 degrees with the surface of the wafer. If the rectangular or square opening is small with respect to the wafer thickness, a recess is formed. For example, a small etched rectangular surface shape will produce an elongated, V-grooved recess with all walls at 54.7 degrees with the wafer surface. As is well known in the art, only internal surfaces may be anisotropically etched. External or convex corners do not have {111} planes to guide the etching and the etchant etches away such corners very rapidly. This is why the channels cannot be opened at their ends, but instead must be completed by a separate process, such as milling. In the preferred embodiment, however, the channel recesses may be opened by an isotropic etch of a short predetermined time period, such as two minutes, to undercut the thin nitride mask, followed by a short KOH anisotropic etch, for example for five minutes, to complete the opening of the channels. Since isotropic etching etches equally in all directions at the same time, this removal of silicon must be taken into account when the anisotropic etching is designed. Because the channels have been isotropically then anisotropically etched opened, the channels walls have been shortened but are still within the desired length of around 20 mils or 0.5 mm.

The original surface of the wafer with the silicon nitride layer serves as the bonding area for bonding the two wafers together, one having the plurality of sets of channels with associated manifolds, and the other having the plurality of sets of heating elements and addressing electrodes. The bonding area is coated with an adhesive in a manner discussed below and then the two wafers are aligned together by using an infrared aligner-bonder which holds the channel wafer and aligns the channel wafer with the heating element wafer. Instead of using alignment holes 40 in wafer 39, alignment marks (not shown) on this wafer can be used such as, small etched pits which, because of the angle of their sides defined by the intersection of the {111} planes, are seen as opaque patterns in an infrared microscope. The alignment marks 38 on the wafer 36 having the plurality of sets of heating elements 34 can be aluminum patterns, for example, which are also infrared opaque. Therefore, use of an infrared microscope with infrared opaque markings on each wafer to be aligned is yet another alternative technique to the alignment of the wafers together.

The subject matter of the present invention includes a method of applying the adhesive to the channel plate that results in all mating surfaces of the two assembled wafers being well bonded, while all fluid surfaces (i.e., surfaces in contact with the ink) are free of adhesive. This is achieved by spraying or spin coating a thin coat of adhesive of about 4 microns or less thick to a flexible secondary substrate (not shown) which is then applied to the lands or high points 47 of the channel plate. After a uniform pressure and temperature is applied to insure adhesive contact on all unetched surfaces of the channel plate, the secondary substrate is peeled away in a controlled manner that leaves a uniformly thin film of about 2 microns or less of adhesive on all unetched surfaces of the channel wafer. This process is discussed in more detail later. This wafer can be subsequently aligned, bonded and cured with the heater wafer to form completed printheads.

The adhesive may be sprayed or spin coated onto a flexible substrate or a thin plastic secondary substrate, such as, for example, a wafer grip substrate, marketed by Dynatex Corp., Redwood City, Calif., and sold as part no. 714312. In the preferred embodiment, the secondary substrate is coated with adhesive by spin coating it with diluted EPON® thermoplastic, thermosetting adhesive, sold by Shell Chemical Company. The adhesive is diluted in a solvent, preferably MIBK, although most general purpose solvents can be used. The optimum solids content was established imperically as 25 percent solids of EPON® 1002F resin from Shell Chemical Company with 7 percent "Y" curing agent and MIBK. Relationships also exist which correlate viscosity, spin speed, and time to the thickness desired. Transfer thicknesses can be controlled from one quarter micron plus or minus one-tenth micron for spin coated flexible substrates to several microns for spray coated flexible substrates. After coating, the secondary substrate is applied to the channel wafer with slight heat and pressure. After adhesive transfer is identified via an optical density change at the interface, the secondary substrate is peeled away from the channel wafer. The coated channel wafer can now be aligned and bonded to the heater wafer or stored for later use. Storage of the channel wafer with the adhesive layer can be as long as 1,000 hours with B-stageable adhesives before use. A roller may be applied to the secondary substrate to insure contact of the adhesive on all lands or high points of the channel plate. Optionally, a method of applying the secondary substrate with adhesive to the channel plate would be vacuum lamination. The secondary substrate and the channel wafer are then slightly heated to about 100° F. to encourage flow of the adhesive and maintain it in the liquid state when the flexible substrate is removed. If heating is not done, the adhesive tends to form strings during the separation process and this is unacceptable. During the separation process, the bond between the adhesive and the secondary substrate and the bond between the adhesive and the channel plate is greater than the cohesive strength of the liquid (heated) adhesive, so that the adhesive fails cohesively and each substrate retains about half of the layer of the adhesive. If the adhesive is heated slightly during the separation, it fails as a liquid. If it is not heated,it fails as a tacky gel, producing strings or streamers that are unacceptable because they may collapse into the walls of the recesses and because they produce an uneven layer that is generally too thick.

The importance of the flexibility of the secondary substrate lies in its ability to be peeled away with high stress concentration at the peeled edge. Less flexible secondary substrates are extremely difficult to separate from the channel plates, and when separation does occur, it is sudden, uncontrollable, and does not result in a uniform, string-free coat. The application of heat during and/or just prior to the separation process is dependent on the solvent used to yield a low viscosity adhesive solution. If the viscosity can be maintained low enough with respect to the time duration between spin coating and transfer, the application of heat would not be required for cohesive failure of the adhesive.

When applying adhesive to the channel wafer such that only the high points or lands of the wafer are uniformly and thinly coated, three problems had to be dealt with. First, a very thin adhesive film having a thickness of around one to two microns was required on the lands or high points of the channel plate. Next, the adhesive had to be uniform over the entire wafer surface receiving the adhesive because the adhesive must not only bond the channel plate and the heating element plate together, but must also function as a seal between the channel walls. Finally, it was necessary to avoid or minimize adhesive on any of the side walls of the channels or ink reservoir to prevent significant reduction in the ink flow path and to prevent possible break off of adhesive which could be carried into one or more channels to block or reduce the flow therein. The two key features of the present inventive bonding process are that a thin deposition of adhesive on a secondary flexible substrate is possible by using spray or spin techniques and that after the placement of the flexible substrate on the channel wafer with the thin layer of adhesive lying on the high points thereof, the peeling of the flexible substrate off of the channel plate leaves a relatively uniformly thick layer of adhesive on all parts contacted by the adhesive.

This is accomplished by causing the adhesive layer to fail in a liquid form. Since the molecule-to-molecule forces in a liquid are weak compared to the molecule interface bond, the separation must always occur while the adhesive is in the liquid state, meaning that the surfaces of the channel plate originally contacted by the adhesive layer always retains some but not all of the adhesive when the flexible substrate is removed therefrom. To assure that the adhesive is in the liquid state, the adhesive must be heated to about 100° F. before the flexible substrate is peeled from the channel wafer. This method also allows for coating of microstructures with both vertical and non-vertical walls with adhesive thicknesses varying from one quarter micron to several microns.

When the adhesive layer is appropriately applied to the lands or high points of the channel plate, the coated channel plate is ready for subsquent aligning and thermo-compressive bonding to the heating element plate. In fact, since the epoxy adhesive cures extremely slowly at room temperature, the coated wafers can be stored for months until the heating element plates are ready for bonding. Adhesive on the channel plate is not tacky so it does not hinder alignment. However, during thermo-compressive bonding, the adhesive first reflows giving uniform coverage and then cures, locking the two plates in the aligned position. In one embodiment, after correct alignment is achieved, a small amount of anaerobic adhesive, for example, cyano acrylate is applied to the two wafers to temporarily preserve the wafer alignment while the wafers are carried to the thermo-compressive bonder for flowing and curing. In another embodiment, the bonding method of achieving selective adhesive application is to use a two part adhesive, spraying one part on the heating element wafer and one part on the channel wafer. When these two are aligned and brought into contact, only the mating surfaces bring both parts together for curing. The uncured areas can be cleaned with appropriate solvents. This is not the preferred embodiment, however, because the mix ratio of the adhesive may not be satisfied at all points to yield a quality bond. Another embodiment for bonding the heating element plate and the channel plate involves spraying anaerobic adhesive on either the heater plate or the channel plate. After aligning the two, when the two wafers are brought into contact, the mating surfaces provide an anerobic condition so that adhesive cures, while areas in which the mating does not occur remain uncured and can be subsequently removed via solvent clearing. Both embodiments involve the disadvantage of spray coating adhesive directly on the wafers, which provides nonuniform adhesive layers and contaminates both the heating elements and fluid containing surfaces.

Figure 5:
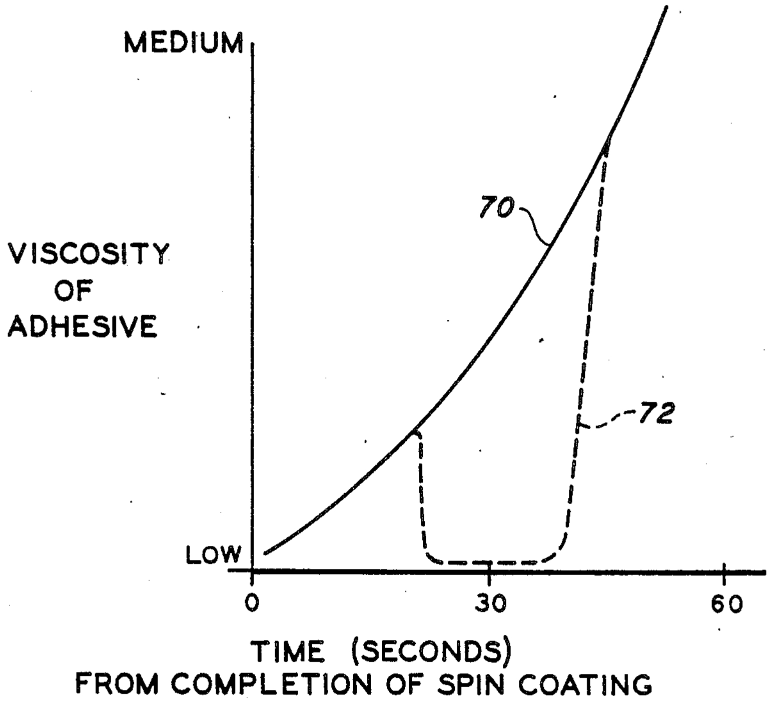
FIG. 5 is a graph depicting adhesive viscosity versus time from initial completion of the spin coating of the flexible substrate.
Figure 6:
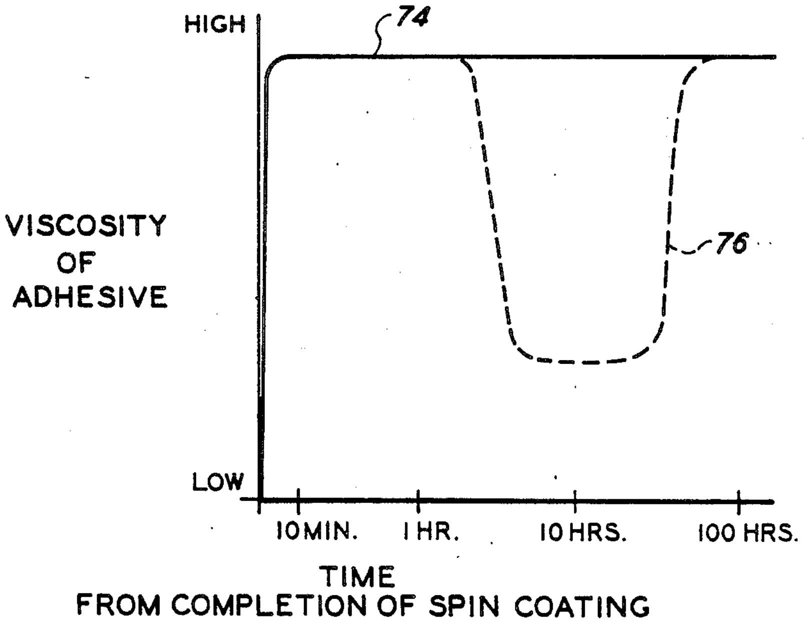
FIG. 6 is a graph depicting adhesive viscosity versus time after completion of the spin coating of the flexible substrate.

In FIGS. 5 and 6 viscosity of the adhesive is plotted against time from completion of the spin coating of the adhesive on the flexible substrate. Curve 70 in FIG. 5 shows the relative rapid increase in viscosity from time zero to one minute after completion of the spin coating of the adhesive. The solvent in this case is MIBK which thus offers the slowest rise in viscosity with time. Curve 72 shows the drop in viscosity of the adhesive with the application of heat at about 100° F. Curve 74 in FIG. 6 shows the rapid rise in viscosity to a relatively stable high viscosity after the first minute or two after completion of the spin coating of the flexible substrate. Curve 76 shows a drop in viscosity of the adhesive with the application of heat and/or pressure for the transfer of the adhesive on the flexible substrate to the lands or high points of the channel wafer 39. Accordingly, it is important that the adhesive be transferred from the flexible substrate to the channel wafer within a minute after the spin coating operation. Once the adhesive has been transferred by the peeling of the flexible substrate from the channel plate during the application of heat as depicted in FIG. 5, the channel plates with the adhesive may then be stored prior to assembly for up to 1,000 hours. The adhesive is bondable and curable for a relatively long period of time, but as depicted in FIGS. 5 and 6, the adhesive cannot be satisfactorily transferred from the flexible substrate beyond one minute after the spin coating operation, because the viscosity cannot be lowered enough for cohesive failure by the adhesive when the flexible substrate is peeled from the channel wafer high points or lands, even if heat is applied.

Although spray coating on a flexible substrate is an acceptable method of placing the adhesive layer on a flexible substrate, the spray coating process provides poor thickness control and generally such coatings average about 3 microns. In contrast, spin coating of the flexible substrate provides more predictable adhesive coating and such coatings are thinner, generally in the range of one-half micron.

The following formula describes the thickness (H) of a viscous fluid on a rotating disc at room temperature. H is approximately equal to $(3v/4\omega^2t)^{\frac{1}{2}}$, where H is height in centimeters, v is kinematic viscosity (centistokes), $\omega$=RPM's, t=seconds. The formula was obtained from the reference entitled "Flow of a Viscous Liquid on a Rotating Disk", A. G. Emslie et al, J. Appl. Phys., Vol. 29, No. 5, pp. 858–862, May 1958. Since the kinematic viscosity is equal to viscosity divided by $\rho$ for density, various solutions of adhesive and carrier fluids such as acetone, ethyalcohol, methylalcohol and water can be investigated for the appropriate carrier solution to provide a fluid height on the flexible substrate. For example, assuming a height of $0.5\times10^{-4}$ cm$=(3v/4\times3500^2\times5)^{\frac{1}{2}}$, where $\omega$ is equal to 3500 RPM's and the time is equal to 5 seconds, then the v or kinematic viscosity is 0.2 centistokes. This formula is rather accurate for predicting thickness of a viscous fluid on a rotating disc. No such formula is available for spray coating operations however, but the average thickness of a spray coated flexible substrate has been found to be about 3 or more microns with poor uniformity in comparison to spin coating.

Figure 4:
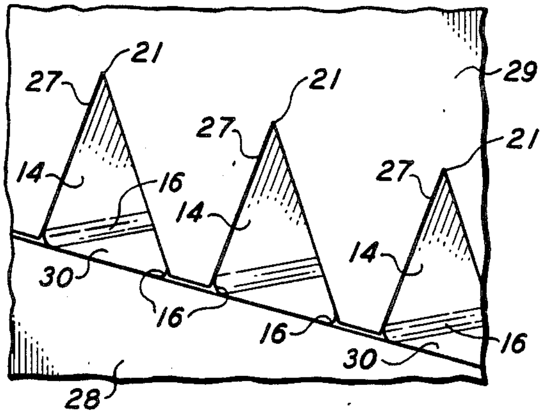
FIG. 4 is an enlarged view of the printhead face identified as portion A in FIG. 1 showing the printhead nozzles and the adhesive fillets bonding the two printhead parts together.

Once the flexible substrate has been spray or spin coated, the carrier fluid evaporates rather fast and as mentioned above must be transferred to the channel wafer lands or high points within a minute or two. This procedure of (1) smoothing the flexible substrate with the adhesive contiguous with the channel wafer lands, (2) applying a temperature and slight pressure to assure contact with all of the high points on the wafer, and then (3) peeling the flexible substrate off with the large angle causes the adhesive to fail cohesively, so that about half of the thickness of the adhesive layer remains with the flexible substrate and the remainder is transferred to the lands or high points of the channel wafer. When the channel wafer and the heating element are aligned and pressed together under a temperature of about 100° F., the layer of adhesive will tend to be squeezed between the mating surfaces and form fillets of adhesive internally of the channel grooves and manifold reservoir. Refer to FIG. 4 where fillets 16 of adhesive may be seen. Accordingly, it is important that the adhesive be substantially uniform and very thin to prevent significant reduction in the ink flow channels once the adhesive is cured and the printheads are formed. This is because the adhesive layer on the lands 47 between the ink channels 14 is substantially squeezed therefrom into the channel corners adjacent the heater plate 28 to form the fillets 16. Therefore, the thicker the adhesive layer, the bigger the fillets.

Figure 7:
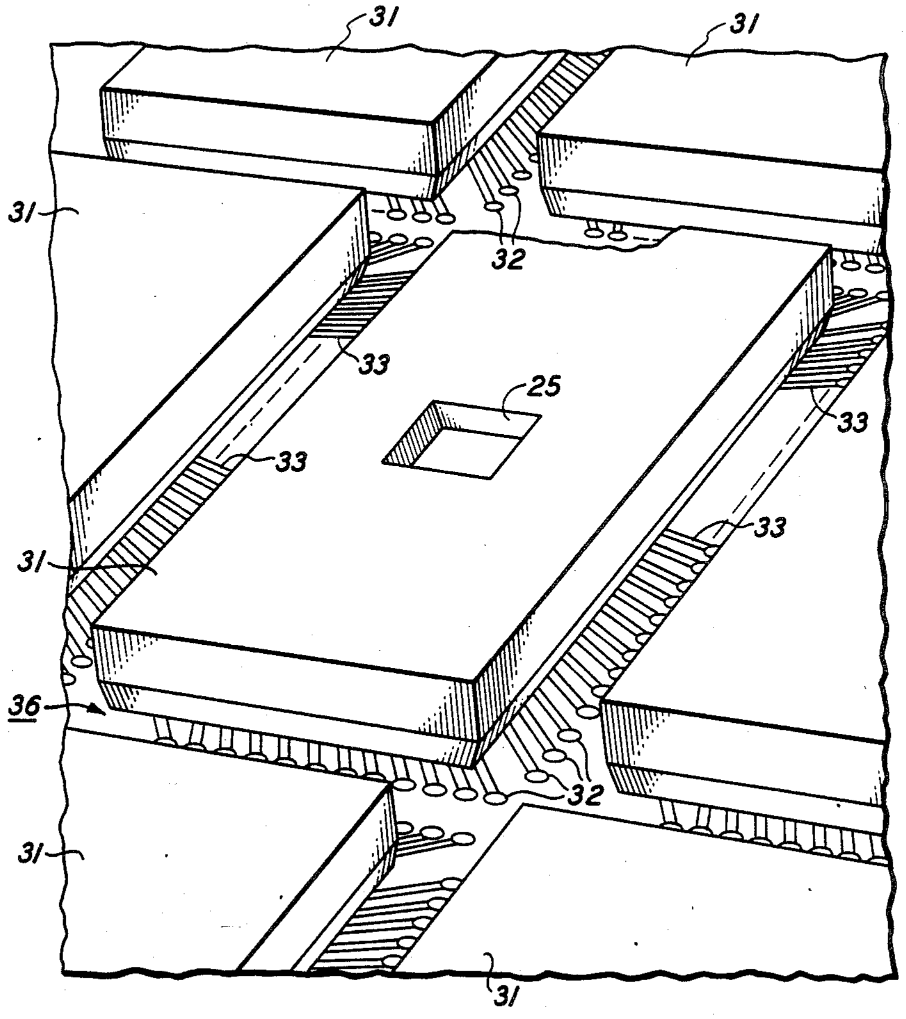
FIG. 7 shows an enlarged isometric view of the channel plate wafer bonded to the wafer with the heating elements after the excess channel wafer material has been removed and prior to dicing into individual printheads.

The alignment openings 40 are used with a vacuum chuck mask aligner to align the channel wafer 39 via the alignment marks 38 on the heating element and addressing electrode wafer 36. The two wafers are accurately mated and tacked together by partial curing of the adhesive. Alternatively, the heating element and channel wafers 36, 39 can be given precisely diced edges and then manually or automatically aligned in a precision jig. The grooves 14 automatically are positioned by either alignment operation, so that each one has a heating element therein located a predetermined distance from the nozzles or orifices in the channel plate edge 29 (see FIG. 1). The two wafers are cured in an oven or a laminator to permanently bond them together and then the channel wafer is milled to produce individual upper substrates with the manifolds and ink channels as shown in FIG. 7. Care must be taken not to machine exposed printhead electrode terminals 32 which surround the three sides of the manifold that do not have the nozzles. The recesses 46 and the elongated grooves 53 greatly assist in preventing damage to the printhead electrodes 33 and terminals 32 by spacing the upper substrate therefrom. The heating element wafer 36 is then diced to produce a plurality of individual printheads which are bonded to a daughter board and the printhead electrode terminals are then wire bonded to the daughter board electrodes.

Many modifications and variations are apparent from the foregoing description of the invention and all such modifications and variations are intended to be within the scope of the present invention.

We claim:

1. A method of bonding mating surfaces of at least two components together, wherein at least one of the surfaces to be bonded contains recesses therein and wherein said recesses require minimum entrant into or minimum volume reduction by the adhesive after completion of the bonding of the components, the bonding method comprising the steps of:

(a) applying a relatively thin layer of an adhesive to a flexible substrate, the adhesive being of the type capable of having a state wherein its viscosity is lowered to a point that its molecule-to-molecule adhering forces are weaker than its molecule-to-interface bonding forces upon the application of a predetermined temperature within a predetermined time period after the adhesive layer is applied to the flexible substrate;

(b) placing the adhesive layer that is on said flexible substrate on the surface of the component having the recesses and heating the adhesive layer so that it enters said state of low viscosity within said predetermined time period, the adhesive layer contacting only the higher surface portions of the component having the recesses and not contacting any of the recess surfaces;

(c) peeling the flexible substrate away from the surface of the component having the recesses at an angle thereto such that high stress is placed on the adhesive layer at the peeled edge of the flexible substrate, the peeling being done within said predetermined time period and while the adhesive is in said low viscosity state, so that the adhesive layer fails cohesively leaving about half of the adhesive layer on the flexible substrate and the remainder of the adhesive layer coating the higher surface portions of the component having the recesses;

(d) aligning and mating the surface of the component having the adhesive coating on its higher surface portions with a surface of the other component; and (e) curing the adhesive to bond the mated components together.

2. The bonding method of claim 1, wherein the adhesive used in step (a) further comprises the type having an intermediate, non-tacky curing stage, so that, after transfer of the adhesive from the flexible substrate to the higher surface portions of the component having the recesses, said component may be stored with the adhesive for subsequent mating and bonding with the other component at a later time.

3. The bonding method of claim 1, wherein the application of the adhesive layer to the flexible substrate in step (a) is accomplished by spraying.

4. The bonding method of claim 3, wherein the predetermined time period of step (c) is one to two minutes and the predetermined temperature of step (b) is about 100° F. or 37.8° C.

5. The bonding method of claim 1, wherein the application of the adhesive layer to the flexible substrate in step (a) is accomplished by spin coating.

6. The bonding method of claim 5, wherein the predetermined time period of step (c) is one to two minutes and the predetermined temperature of step (b) is about 100° F. or 37.8° C.

7. The bonding method of claim 6, wherein the spin coating of the adhesive layer is accomplished in a manner to produce a layer of adhesive having a thickness of about one micron or less.

8. The bonding method of claim 7, wherein the bonding method further comprises at step (b):

applying a predetermined pressure to the flexible substrate, in addition to said predetermined temperature, in order to assure uniform contact of the adhesive layer with all of the higher surface portions of the component having the recesses, so that when they subsequently mate with the surface of the other component to be bonded thereto, all such mating surfaces will be uniformly coated with adhesive and a strong bond will be assured.

9. A method of bonding at least two ink jet printhead components together, wherein one of the components contain on a surface thereof an equally spaced, linear array of heating elements and addressing electrodes for enabling the individual addressing of each heating element with current pulses and wherein the other component contains on a surface thereof a plurality of equally spaced, parallel grooves and a recess, one end of the grooves communicate with the recess and the other ends of the grooves are opened through an edge of said other component, the bonding method comprising the steps of:

(a) applying a relatively thin, uniform layer of a heat curable adhesive to a surface of a flexible substrate, adhesive being of the type having an intermediate, non-tacky curing stage;

(b) placing the adhesive layer on the flexible substrate against the printhead component surface containing the recess and grooves within a predetermined time of the application of the adhesive to the flexible substrate, so that the adhesive only contacts the lands thereof;

(c) applying a predetermined temperature and pressure to the flexible substrate to assure uniform contact of the adhesive layer on the lands of the printhead component containing the recess and grooves;

(d) peeling the flexible substrate from the lands of the printhead component having the recess and grooves, while the adhesive is at a predetermined temperature so that the adhesive cohesively fails in the liquid state, whereby about half of the adhesive layer thickness remains on the flexible substrate in said intermediate curing stage;

(e) aligning the printhead components with their respective surfaces, one containing the heating elements and the other the recess and associated grooves, confronting and contacting each other, so that each groove contains a heating element therein spaced a predetermined distance from the groove open ends; and (f) curing the adhesive to bond the two printhead parts together, so that the recess serves as an ink supplying manifold, the grooves serve as capillary-filled channels, and the groove open ends serve as the printhead nozzles.

10. The method of bonding surfaces of at least two parts together, wherein the surface to be bonded of one of the parts has raised surface portions or recesses therein, the method comprising the steps of:

(a) coating a flexible substrate with a layer of adhesive having a predetermined thickness;

(b) transferring only part of the thickness of the adhesive layer on the flexible substrate to the surface of the part having the raised surface portions or recesses by:

(1) placing the flexible substrate on the surface of the part having the raised surface portions or recesses with the adhesive layer sandwiched therebetween, so that only the higher surface portions contact the adhesive layer, (2) causing the layer of adhesive to enter a low viscosity state, and (3) peeling away the flexible substrate from the part surface while the layer of adhesive is in the low viscosity state in a manner so that the adhesive layer fails cohesively, whereby about half of the adhesive layer thickness remains with the peeled away flexible substrate and the rest of the adhesive layer thickness remains only on the higher surface portions of the part;

(c) confrontingly aligning and mating the surface of the part having the transferred adhesive layer with a surface of the other part; and (d) compressively curing the adhesive layer between the surfaces of the parts with a predetermined temperature and pressure to bond them together permanently with minimal flow of the adhesive layer from between the higher surface portions of the one part and the confronting surface of the other part.

* * * * *